United States Patent [19]

Zimmer

[11] 3,947,929

[45] Apr. 6, 1976

[54] PRINTING BLANKET NEEDLE FOR SECURING A FABRIC TO A PRINTING BLANKET

[76] Inventor: Peter Zimmer, Untere Sparchen 54, A 6330 Kufstein, Austria

[22] Filed: Sept. 3, 1974

[21] Appl. No.: 502,413

[30] Foreign Application Priority Data

Sept. 4, 1973 Austria ............................... 7666/73

[52] U.S. Cl. ................................ 24/150 R; 198/198

[51] Int. Cl.[2] ........................ B65G 15/42; A44B 9/00

[58] Field of Search ........... 198/198, 200; 24/150 R, 24/94, 95, 96, 208 A, 216, 217, 214, 31 L, 90 PR, 90 R; 161/401

[56] References Cited

UNITED STATES PATENTS

| | | | |
|---|---|---|---|
| 712,020 | 10/1902 | Tinsley | 198/198 |
| 1,327,296 | 1/1920 | Solem | 198/198 |
| 1,812,287 | 6/1931 | Davis | 198/198 |
| 2,172,594 | 9/1939 | Purinton | 24/95 |
| 2,664,691 | 1/1954 | Wiebe | 198/198 UX |
| 2,785,453 | 3/1957 | Wentz | 24/217 |
| 2,903,765 | 9/1959 | Best | 24/150 R X |
| 3,469,290 | 9/1969 | Andrews | 24/208 A |
| 3,494,246 | 2/1970 | Hensley | 24/95 X |
| 3,526,207 | 9/1970 | Nadelson | 198/198 X |
| 3,526,955 | 9/1970 | Cilione | 24/94 X |

*Primary Examiner*—Donald A. Griffin
*Attorney, Agent, or Firm*—Michael J. Striker

[57] ABSTRACT

A method is disclosed of securing a fabric web to a printing blanket. A plurality of needles are inserted into the printing blanket at the web-supporting side thereof, so that tips of the needles project from that side. The needles are then anchored in the printing blanket and the web is placed onto the printing blanket so that the tips of the needles enter into the fabric web and retain the same against displacement relative to the printing blanket. A needle for this purpose is also disclosed.

7 Claims, 3 Drawing Figures

PRINTING BLANKET NEEDLE FOR SECURING A FABRIC TO A PRINTING BLANKET

BACKGROUND OF THE INVENTION

The present invention relates generally to printing blankets, and in particular to a method of securing a fabric web to a travelling printing blanket without having to resort to adhesives, and to needles suitable for this purpose.

Printing blankets are in effect endless belts on which a web is supported when it is to be printed in a printing machine. Frequently, such printing machines have two or more printing stations at which different patterns or colors are applied to the web in successive operations. To assure that from one station to the next the web will not move out of registry it is necessary that the web be prevented from shifting with reference to the printing blanket on which it is supported. This is particularly true if the web is of the type that is inherently extensible, for instance a fabric, such as a high-nap fabric such as rugs, carpets and the like.

According to the prior art this fixed connection with the printing blanket is achieved by bonding the web to the surface of the printing blanket with an adhesive that permits the web later to be stripped off again. However, with certain types of fabric webs this creates difficulties. Particularly in the case of high-nap fabric webs, such as carpets, rugs or the like, both the top side and the bottom side of the fabric web are quite rough and it is therefore not possible to bond the bottom side of the web to the printing blanket over their entire interface. Instead, a bonding usually takes place only at a series of spacedapart locations which does not afford the desired effect. Moreover, although the bonding agent or adhesive must permit the material to be subsequently stripped off the printing blanket again, it must nevertheless have excellent bonding ability and in the case of high-nap fabric webs this usually means that when the web is subsequently stripped off the printing blanket, a quite large number of nap fibers or threads are lost from the web, because they are simply pulled out of the web when the latter is stripped off, due to the fact that they adhere too tightly to the bonding agent. Added to these disadvantages is the fact that once the fabric web is stripped off the printing blanket, the latter must be washed to remove all traces of the adhesive bonding agent, which is frequently difficult. The adhesive itself is not inexpensive.

These problems are not new. They have been recognized in the prior art and an attempt was made to overcome them by using needles to hold the fabbic web in place. However, heretofore these needles were always secured in separate relatively narrow strips or bands which were then in turn secured to the printing blanket. The prior art has never attempted to provide needles directly in the printing blanket itself, with good reason. The separate bands which are relatively narrow and have a width of only approximately 50 – 60 millimeters, could be readily produced in uniform thickness, even if the thickness was relatively substantial. A relatively substantial thickness, however, was necessary in order to assure that the completely cylindrical shafts of the needles were properly retained in the material of the bands in order to prevent them from lying down or extending skew to the exposed surface of the bands rather than normal thereto as is intended. The inclusion of the needles directly in the printing blankets was held to be impossible, especially in the case of printing blankets which are used for rotary printing and which may have a width of up to 5 meters or possibly even more. Because of the various requirements which are made of such printing blankets and are known to those skilled in the art, these printing blankets must be relatively thin, having a thickness on the order of approximately 2 – 3 millimeters. A few experimental attempts carried out in the industry and aimed at providing needles directly in the printing blankets, met with complete failure because the thickness of the printing blankets was simply insufficient to properly maintain the needles in such a position that their projecting tips would extend normal to the plane of the printing blanket surface. The result was that in use the needles would extend skew in one or the other direction and permit shifting of the fabric web (rather than preventing it) when forces acted upon the web tending to shift it lengthwise of the printing blanket.

SUMMARY OF THE INVENTION

Accordingly, it is an object of this invention to overcome the disadvantages of the prior art.

More particularly, it is an object of the invention to provide an improved method of securing a fabric web, particularly a web of a high-nap fabric, on a printing blanket.

Another object of the invention is to provide such a method which utilizes needles that are directly anchored in the printing blanket.

An additional object of the invention is to provide a novel needle to carry out the method.

In keeping with these objects, and with others which will become apparent hereafter, one feature of the invention resides in a method of securing a fabric web, particularly a web of high-nap fabric, on a printing blanket with which the web is to travel without any possibility of relative shifting of the web and the printing blanket. Briefly stated, the method comprises the steps of inserting a plurality of needles into the printing blanket at a web-supporting side thereof, so that tips of the needles project outwardly beyond this side. The needles are thereupon anchored in the printing blanket, and the fabric web is placed onto the web-supporting side so that the tips of the needles enter into the fabric web and retain the same against displacement relative to the printing blanket.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
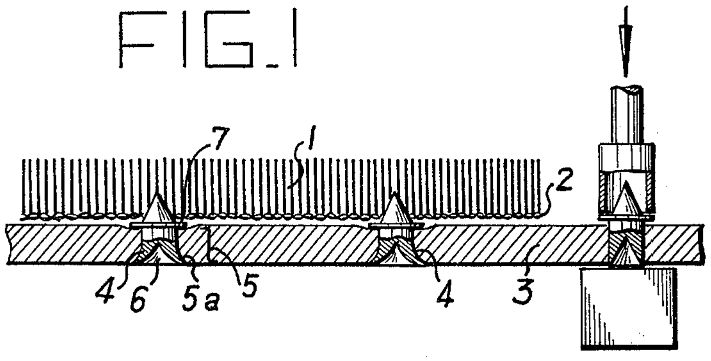
FIG. 1 is a fragmentary diagrammatic cross section of a printing blanket incorporating the present invention and having a fabric web secured to it.

Referring firstly to FIG. 1 it will be seen that reference numeral 1 indicates fragmentarily a part of a fabric web 1 which in the illustrated embodiment is a high-nap fabric, such as a carpet or a rug to be printed. The bottom side 2 of the web 1 is to be retained on the travelling printing blanket 3 so that there can be no relative displacement between them. For this purpose the printing blanket 3 has directly anchored in it a plurality of needles 4 having a shaft 5 the material of which is upset as shown at 5*a*, by being bent outwardly, thereby anchoring the needle 4 in the printing blanket 3. A free tip 8 of each needle projects upwardly and outwardly beyond the web-supporting surface of the printing blanket, and at the junction between the tip 8 and the shaft 5 there is provided an abutment flange 7 which engages the web-supporting surface of the printing blanket. This engagement, coupled with the upsetting of the material of the needle 4 at 5*a*, anchors each needle in the printing blanket 3 in such a manner that the needle cannot assume any position other than the illustrated one in which the tip 8 extends normal to the plane of the web-supporting surface.

It is advantageous if the needles are installed in the printing blanket directly, for which purpose a hard (e.g. metal) element is placed beneath the printing blanket to serve as an anvil, and the needles 4 are driven into the printing blanket from the web-supporting surface of the latter. A tubular drive member can be utilized which is placed about the tip 8 and engages the flange 7 so that, when blows are exerted upon this member, the force of the blows is transmitted via the flange 7 to the needle and the rear end thereof is driven into the printing blanket. Once the rear end comes near the anvil or comes in contact therewith, the material of the rear end becomes deformed as at 5*a* and the needle is anchored in the printing blanket.

Figure 2:
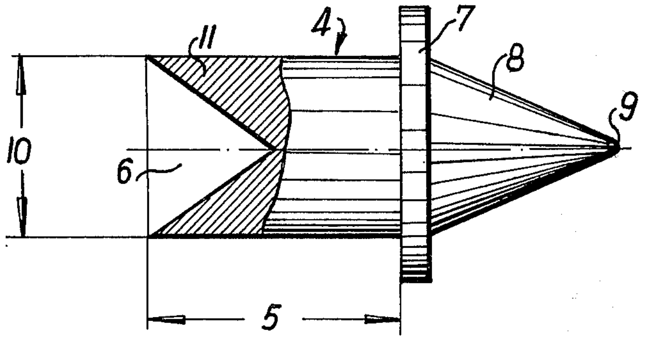
FIG. 2 is a plan view, partly in section, of a needle according to the present invention.

FIG. 2 shows an embodiment of a needle 4 that is suitable for the intended purpose. The needle 4 of FIG. 2 is shown in its undeformed condition, that is prior to installation in the printing blanket. The reference numerals that have been previously employed with respect to FIG. 1 are also applicable with respect to FIG. 2. It should be noted that the conical tip 8 has a rounded end 9. The purpose is to absolutely prevent the presence of any burrs or the like which, when the tip 8 enters into the fabric web, could snag threads or fibers of the web and pull them out of the latter when the fabric web is subsequently lifted off the printing blanket. The tip 8 of course enters into the fabric of the fabric web, into the layer 2 thereof, so that the fabric web is prevented from shifting relative to the printing blanket as it travels with the same.

The rear end of the shaft 5 of the needle is formed with a conical recess or bore 6. When the needle is inserted into the printing blanket in the manner described with respect to FIG. 1, a cutting edge 11 which bounds the recess 6 punches out a portion of the printing blanket having the diameter 10. As pointed out before, once the cutting edge 11 comes in contact with the aformentioned anvil it bends over as indicated at 5*a* in FIG. 1, thus anchoring the shaft 5 in the printing blanket. Thus, a firm anchorage is achieved, and due to the anchorage as at 5*a* and the presence of the flange 7 the needles are not only reliably anchored in the printing blanket 3, but are also prevented from tilting despite the fact that the thickness of the printing blanket is very small, that is on the order of 2 – 3 millimeters or the like.

Figure 3:
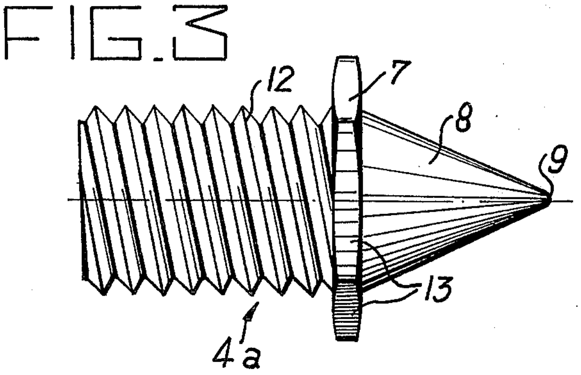
FIG. 3 is a view similar to FIG. 2, but illustrating a further embodiment of a needle according to the invention.

The needle 4*a* shown in FIG. 3 is the same as the one in FIG. 2, except that the recess 6 and the cutting edge 11 have been omitted. Instead, the shaft 5 is provided with a screw thread 12 which may be of the self-tapping type, that is the kind which will cut its own counterthreads in the material of the printing blanket 3. In this case it is advantageous if the circumference of the flange 7 is provided with flats 13, that is facets which can be engaged by a wrench or the like to facilitate turning of the needle 4*a*. The needle of FIG. 3 is of course not inserted into the printing blanket 3 by means of blows, but instead is threaded into the material of the printing blanket 3.

It will be appreciated that instead of making the shaft 5 cylindrical as illustrated in the two embodiments, it could also have a different configuration. For instance, it could be conical and taper in direction away from the tip 8, in order to facilitate the insertion of the shaft into the printing blanket.

It will be understood that each of the elements described above, or two or more together, may also find a useful application in other types of constructions differing from the types described above.

While the invention has been illustrated and described as embodied in the needling of printing blankets, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An anchoring needle for securing a web on one side of a printing blanket, comprising a shaft having a tapered first end portion formed as a tip, and a second end portion formed with an anchoring portion, said anchoring portion having an annular cutting edge adapted to penetrate the printing blanket when said second end portion of said needle is forced from said one side towards the other opposite side of the printing blanket and extending at most up to said other opposite side so that the latter is free of any unevenness resulting from the presence of said needle.

2. A needle as defined in claim 1, wherein said shaft is cylindrical.

3. A needle as defined in claim 1; and further comprising a flange between said first end portion and said shaft.

4. A needle as defined in claim 1, wherein said tip is rounded and said first end portion has a smooth outer surface to prevent snagging when said first end portion penetrates into a fabric web.

5. A needle as defined in claim 1, wherein said anchoring portion is constituted by an axially extending conical recess in said second end portion, said recess being bounded by said cutting edge and the material of said second end portion serving to anchor the needle when said recess is enlarged in radially outward direction as the wall bounding it is upset in said outward direction.

6. A needle as defined in claim 1, wherein said second end portion is formed with an external thread; and wherein a flange is provided intermediate said first end portion and said shaft and is formed with facets for engagement by a tool serving to turn said needle.

7. A printing blanket, comprising a web-shaped body having one surface adapted to receive a workpiece web to be printed and an opposite surface; and at least one anchoring needle for securing said workpiece web to said one surface of said body, said needle having a tapered first end portion formed as a tip and projecting beyond said one surface, and a second end portion formed with an anchoring portion, said anchoring portion having an annular cutting edge penetrating into said body from said one surface towards said opposite surface and being located within said body so that said opposite surface is free of any unevenness resulting from the presence of said needle, whereby damage to structures subjacent said opposite surface of said body is prevented.

* * * * *